United States Patent
Beutler et al.

(10) Patent No.: US 10,042,232 B2
(45) Date of Patent: Aug. 7, 2018

(54) OPTICAL AMPLIFIER ARRANGEMENT, LASER AMPLIFIER SYSTEM AND PROCESS

(71) Applicant: APE Angewandte Physik und Elektronik GmbH, Berlin (DE)

(72) Inventors: Marcus Beutler, Berlin (DE); Ingo Rimke, Berlin (DE)

(73) Assignee: APE Angewandte Physik und Elektronik GmbH, Berlin (DE)

( * ) Notice: Subject to any disclaimer, the term of this patent is extended or adjusted under 35 U.S.C. 154(b) by 0 days.

(21) Appl. No.: 15/427,415

(22) Filed: Feb. 8, 2017

(65) Prior Publication Data
US 2017/0235209 A1 Aug. 17, 2017

(30) Foreign Application Priority Data

Feb. 11, 2016 (DE) .................. 10 2016 202 098

(51) Int. Cl.
*G02F 1/39* (2006.01)
*G02F 1/35* (2006.01)
*G02F 1/37* (2006.01)

(52) U.S. Cl.
CPC .............. *G02F 1/39* (2013.01); *G02F 1/3501* (2013.01); *G02F 1/3532* (2013.01); *G02F 1/3544* (2013.01); *G02F 1/37* (2013.01); *G02F 2001/3507* (2013.01); *G02F 2001/392* (2013.01); *G02F 2201/16* (2013.01); *G02F 2203/26* (2013.01)

(58) Field of Classification Search
CPC ........ G02F 1/3501; G02F 1/3532; G02F 1/37; G02F 1/39; G02F 2001/392
See application file for complete search history.

(56) References Cited

U.S. PATENT DOCUMENTS 9,244,332 B1 * 1/2016 Calendron ................ G02F 1/39
9,506,858 B2 * 11/2016 Boppart .................. G01N 21/47
(Continued)

FOREIGN PATENT DOCUMENTS

EP 2 924 500 A1 9/2015

OTHER PUBLICATIONS

Christian Homann, Optical Parametric Processes to the Extreme: From new insights in first principles to tunability over more than 4 octaves, Dec. 2012.
(Continued)

*Primary Examiner* — Daniel Petkovsek
(74) *Attorney, Agent, or Firm* — Bachman & LaPointe, PC (57) ABSTRACT

An optical amplifier arrangement has optical parametric amplifiers and white light generations and harmonic generation, in particular frequency doubling, for generating a wide visible to infrared, in any case near-infrared, spectrum of coherent ultra-short light pulses, in particular with a pump laser. During operation the fundamental is in a wavelength range above 950 nm, and the second signal light and the second idler light of the second optical parametric amplifier together cover a tunability range of wavelengths between 500 nm and 5 μm, in particular between 550 nm and 3 μm, wherein between wavelengths in the tunability range throughout continuous tuning can be carried out, namely through the degeneration range of the second optical parametric amplifier at the fundamental of the pump laser.

16 Claims, 5 Drawing Sheets

(56) References Cited

U.S. PATENT DOCUMENTS

2007/0237191 A1* 10/2007 Kafka .................. H01S 3/2308
372/20
2013/0265636 A1* 10/2013 Gusev ...................... G02F 1/39
359/342

OTHER PUBLICATIONS

C. Manzoni et al., Tunable Few-Optical-Cycle Pulses With Passibe Carrier-Envelope Phase Stabilization from an Optical Parametric Amplifier, Applied Physics Letters, pp. 171111-1 bis 171111-3, (2007).

* cited by examiner

| Abbreviated name | Description | Feature |
|---|---|---|
| Pump | Laser oscillator/amplifier | Ultra-short pulses, pump tunable in limited range, typically corresponding to laser gain medium, repetition rate up to several MHz, >10 µJ pulse energy |
| SHG | Doubler | Typically 40-60% efficiency, pulse duration +/- 10% pump |
| WLC 1 | white light generation | Stokes arm (red part) of the continuum used, at least 5% longer than laser wavelength |
| OPA 1 (Pre-OPA) | Amplifier for generating the extended seed | Amplifies WLC 1, pumped with pump light not converted at SHG (depleted pump) (Figure 1A) or with pump light directly (Figure 1B), i.e. branched off upstream of SHG |
| WLC 2 | Extended white light | Seed between ~500 and 2000 nm, gap-free, in particular around the pump wavelength |
| OPA 2 (Main OPA) | Amplifier | Pumped with SHG, tunable |

OPTICAL AMPLIFIER ARRANGEMENT, LASER AMPLIFIER SYSTEM AND PROCESS

BACKGROUND OF THE INVENTION

The invention relates to an optical amplifier arrangement, a laser amplifier system comprising an optical amplifier arrangement and a method for generating a wide visible to infrared, in any case near-infrared, spectrum of coherent ultra-short light pulses with an optical amplifier arrangement.

Methods for generating a spectrum of coherent ultra-short light pulses with an optical amplifier arrangement—albeit not a wide visible to infrared, in any case near-infrared, spectrum of coherent ultra-short light pulses—are known in principle.

With respect to the German priority application having the file reference 10 2016 202 098.6 with respect to the present application, the German Patent and Trademark Office searched the following prior art: EP 2 924 500 A1 and the thesis at the LMU Munich by Christian Homann entitled "Optical parametric processes to the extreme from new insights in first principles to tunability over more than 4 octaves" (2012).

SUMMARY OF THE INVENTION

The invention provides an optical amplifier arrangement and a method with optical parametric amplifiers of the amplifier arrangement for generating a wide visible to infrared, in any case near-infrared, spectrum of coherent ultra-short light pulses. The invention is based—in terms of concept—on an arrangement known in principle of at least two OPAs (optical parametric amplifiers), i.e. at least a first optical parametric amplifier (OPA1) and a second optical parametric amplifier (OPA2), which are pumped and seeded with different wavelengths; i.e. (in the context of the English jargon known for this) input pulses (seed pulses) are applied to the input, said pulses being amplified by means of a conversion process with temporal and spatial overlap of a seed pulse with a pump pulse in a nonlinear medium, such as a nonlinear crystal or the like, in the OPA.

EP 2 924 500 A1 discloses a method for processing femtosecond light pulses from a fundamental frequency of a primary laser with a system of two optical parametric amplifiers and disposed upstream thereof a pulse stretcher, a further optical parametric amplifier and a pulse compressor or an amplifier for generating the femtosecond light pulses having high pulse energy. Already the first and also the second of the two optical parametric amplifiers of the system are in each case pumped with a second harmonic of the fundamental; the first of the two optical parametric amplifiers of the system with a second harmonic of the pulses from the pulse compressor and the second of the two optical parametric amplifiers of the system with a second harmonic of the pulses from the amplifier. The second of the two optical parametric amplifiers of the system is seeded with stretched pulses directly from the first optical parametric amplifier in order to amplify them with the pump pulses of the second harmonic of the pulses from the amplifier in the second of the two optical parametric amplifiers of the system.

By contrast, the invention provides the OPA1 for generating a red-shifted pulse from an already spectrally widened continuum of light of relatively low intensity—the latter from a unit (WLC1) designated by white light generation within the scope of its broad meaning.

Said red-shifted pulse is then used for generating a gap-free comparatively extremely wide continuum of light of relatively lower intensity. This is done by means of a further nonlinear interaction in a medium, preferably solid, where a great spectral widening takes place—this is likewise designated by white light generation within the scope of its broad meaning (WLC2). The processes that are of importance in white light generation (WLC, in particular WLC1 and WLC2) are known in English under the concepts of "self phase modulation", "filamentation", "supercontinuum generation" and "white light generation".

The subsequently used seed light or the spectral properties of the seed pulses are generally at a different frequency ("color") compared with the red-shifted pulse from the OPA1 and this seed light or the seed pulses thus in turn serve as a seed pulse for the OPA2. The latter then amplifies part of the so-called supercontinuum.

In principle, an OPA ("optical parametric amplifier") consists of a low-energy source of radiation ("seed"), which is temporally and spatially superimposed together with a source of high energy and shorter wavelength ("pump") in a nonlinear medium. In order to achieve an amplification of the seed, a phase matching (PM) then has to be achieved, which is done by methods such as the use of birefringent crystals or quasi phase matching (QPM) or suchlike nonlinear media. Therefore, in the present case a distinction is drawn linguistically between "seeding" a radiation generator, in particular an OPA, and "pumping" a radiation generator, in particular an OPA and/or a WLC. The associated beam guiding arrangements are designed in accordance with the associated pulse energies in the corresponding radiation path of the "seed" and "pump", respectively.

This concept of two successive OPAs (English abbreviation OPA means "optical parametric amplifier") with intervening nonlinear spectral widening in each case with a unit designated as white light generation (WLC) was disclosed in principle in the literature such as e.g. by Manzoni et al. in Appl. Phys. Lett. 90, 171111 (2007) or Riedle et al. in Appl. Phys. B 71, 457-465 (2000). However, all these studies are based on the use of (titanium-sapphire, Ti:Sa) lasers as pump lasers, i.e. at a pump wavelength around 800 nm to 850 nm and with a low repetition rate of the pulse train (1 kHz). In this respect, this basic principle was disclosed with OPA—namely there a specific variant of an ordinary OPA (oOPA) called non-collinear OPA (nOPA) at 800 nm, 1 kHz, 400 µJ and with pulse durations of 60 fs.

Under these conditions and at the optimum of the Ti:Sa spectrum, it is possible to use significantly high pulse energies (>300 µJ) with, moreover, very short pulse durations (~60 fs); i.e. ultimately there are the best prerequisites for the use of this pump laser in the context of the multiply nonlinear conversion processes of an optical amplifier arrangement mentioned in the introduction in the shorter-wavelength range below a wide visible to near-infrared spectrum of coherent ultra-short light pulses. A method of in this respect extended seed generation for a second OPA was indeed published in this respect by Manzoni et al. and Riedle et al.

However, this is implemented using a pump laser having a comparatively short wavelength and pulse duration and a low repetition rate. Moreover, Manzoni et al. gives preference to the generation of phase-envelope-stable pulses and uses an idler output of the pre-OPA to obtain a coherence property that is of primary importance. Specifically, pulses having a phase envelope (CEP) that is indeed present in principle, with the use of said idler output, become stable regarding this property ("CEP-stable"). Riedle et al. furthermore provides an SHG-pumped OPA1; the latter moreover in a non-collinear arrangement—in this respect, previously known methods of extended seed generation for a second OPA (OPA2) are based on specific alternatives that differ significantly from one another.

The abovementioned concept becomes very problematic in its implementation, moreover, if the abovementioned Ti:Sa-based best prerequisites for the use of this pump laser in the context of the multiply nonlinear conversion processes of an optical amplifier arrangement mentioned in the introduction are not provided. The problems have hitherto obstructed in particular a commercial application of such arrangements. The commercial use of such arrangements for generating a wide visible to infrared, in any case near-infrared, spectrum of coherent ultra-short light pulses is precisely of interest, however.

This is the starting point for the invention, the object of which is to specify an arrangement and a method by means of which it is possible to generate a continuous wide spectrum, in particular a spectrum extending from the visible to the infrared, in any case near-infrared, of coherent ultra-short light pulses. In particular, an implementation of the multiply nonlinear conversion processes of the optical amplifier arrangement mentioned in the introduction is intended to be provided even in the case of a wide visible to infrared, in any case near-infrared, spectrum of coherent ultra-short light pulses and significantly worse conditions than the abovementioned best Ti:Sa-based prerequisites of a pump laser.

In particular, an implementation of the multiply nonlinear conversion processes of the optical amplifier arrangement mentioned in the introduction is intended to be provided even at a lower pulse energy of a wide visible to infrared, in any case near-infrared, spectrum of coherent ultra-short light pulses, in particular at pulse energies down to 1 µJ and less than 10 µJ, in any case significantly below 300 µJ, in particular below 100 µJ.

Preferably, an implementation of the multiply nonlinear conversion processes of the optical amplifier arrangement mentioned in the introduction is also intended to be provided in the case of longer pulses, preferably above 150 fs, in particular above 300 fs or above 500 fs, in particular above 1 ps.

In particular, a tunability of a wide visible to infrared, in any case near-infrared, spectrum—i.e. preferably between 500 nm and significantly beyond 2000 nm, in particular significantly beyond 3000 nm, preferably in any case up to 5 µm or more—of coherent ultra-short light pulses that is generated in this way is intended to be improved. In particular, a handleability of the arrangement and of the method and also a stability of a wide visible to infrared, in any case near-infrared, spectrum of coherent ultra-short light pulses that is generated in this way are intended to be improved.

In particular, an implementation of the multiply nonlinear conversion processes of the optical amplifier arrangement mentioned in the introduction is intended to be provided in which the beam polarizations and beam outputs of the radiation generators, in particular OPA and/or WLC, are advantageously utilized.

The object, concerning the method, is achieved by means of the invention as disclosed herein.

The invention is based on an optical amplifier arrangement of optical parametric amplifiers and white light generations and a harmonic generation, in particular frequency doubling, for generating a wide visible to infrared, in any case near-infrared, spectrum of coherent ultra-short light pulses, in particular with a pump laser, comprising:

a first white light generation and a first optical parametric amplifier for generating a first signal light and a first idler light and also a second white light generation and a second optical parametric amplifier for generating a second signal light and a second idler light and the harmonic generation, which are optically coupled in such a way that during operation the first optical parametric amplifier is seeded by the first white light generation and the second optical parametric amplifier is seeded by the second white light generation, and wherein during operation the first white light generation and the first optical parametric amplifier and the harmonic generation are pumped by a fundamental of a laser, wherein a seed of the first optical parametric amplifier is effected by means of the first white light generation, and the second white light generation is effected by means of the first optical parametric amplifier and the second optical parametric amplifier is pumped by a second or higher harmonic of the fundamental of the pump laser, wherein a seed of the second optical parametric amplifier is effected by means of the second white light generation.

According to the invention, in the case of the optical amplifier arrangement it is provided that during operation the fundamental is in a wavelength range above 950 nm, and the second signal light and the second idler light of the second optical parametric amplifier together cover a tunability range of wavelengths between 500 nm and 5 µm, in particular between 550 nm and 3 µm, wherein between wavelengths in the tunability range throughout continuous tuning can be carried out.

In particular, continuous tuning is intended to be able to be carried out through the degeneration range of the second optical parametric amplifier (OPA2), i.e. through a degeneration range of the second optical parametric amplifier (OPA2) at the fundamental, preferably of the pump laser.

The invention also leads to a method for generating a wide visible to infrared, in any case near-infrared, spectrum of coherent ultra-short light pulses with an optical amplifier arrangement of the above-mentioned type.

In this respect, the invention is based on a method for generating a wide visible to infrared, in any case near-infrared, spectrum of coherent ultra-short light pulses with an optical amplifier arrangement of optical parametric amplifiers and white light generations and a harmonic generation, in particular frequency doubling, for generating a wide visible to infrared, in any case near-infrared, spectrum of coherent light, in particular with a pump laser, in particular with an optical amplifier arrangement according to the disclosure or a laser amplifier system according to the disclosure, comprising:

a first white light generation and a first optical parametric amplifier for generating a first signal light and a first idler light and also a second white light generation and a second optical parametric amplifier for generating a second signal light and a second idler light and the harmonic generation, which are optically coupled in such a way that during operation the first optical parametric amplifier is pumped by the first white light generation and the second optical parametric amplifier is pumped by the second white light generation, and wherein during operation the first white light generation and the first optical parametric amplifier and the harmonic generation are pumped by a fundamental of a laser, wherein a seed of the first optical parametric amplifier is effected by means of the first white light generation, and the second white light generation is effected by means of the first optical parametric amplifier and the second optical parametric amplifier is pumped by a second or higher harmonic of the fundamental of the pump laser, wherein a seed of the second optical parametric amplifier is effected by means of the second white light generation.

According to the invention, it is furthermore provided that during operation the fundamental is in a wavelength range above 950 nm, and the second signal light and the second idler light of the second optical parametric amplifier together cover a tunability range of wavelengths between 500 nm and 5 µm, in particular between 550 nm and 3 µm, wherein between wavelengths in the tunability range throughout continuous tuning can be carried out.

In particular, continuous tuning is intended to be able to be carried out through the degeneration range of OPA2, i.e. through a degeneration range of the second optical parametric amplifier (OPA2) at the fundamental, preferably of the pump laser.

The invention also leads to a laser amplifier system comprising an optical amplifier arrangement of the above-mentioned type and a pump laser.

In particular, the concept of the invention can preferably be explained in the context of the stated object and also with regard to further advantages as follows.

The first white light and second white light serve in each case as seed light and the corresponding first white light generation and second white light generation are arranged in each case on the input side upstream of the first optical parametric amplifier and second optical parametric amplifier, respectively.

During operation, accordingly the first optical parametric amplifier and second optical parametric amplifier are respectively seeded by the first white light generation and second white light generation. All light generations are optically coupled in the context of their arrangement in a beam guidance of an optical set-up with mirrors, prisms, crystals, etc. and delay paths for the temporal delay of pump and seed pulses (that is to say seed light) relative to one another.

The subject matter of one preferred embodiment of the invention is for example a wavelength-tunable light source, that is to say an optical amplifier arrangement of the above-mentioned type, for ultra-short (<1 picosecond, ps) pulses and a method for generating ultra-short (<1 picosecond, ps) pulses by means of the arrangement of the optical parametric amplifiers (OPAs). This is primarily intended to cover the wavelength range in the visible range (VIS) and near-/mid-infrared (NIR/MIR) (approximately 600-2600 nm).

In this respect, the OPA arrangement is pumped with a source of ultra-short light pulses—in the context of one preferred embodiment of the invention for example with a pulse duration (pulse length) of above 100 fs, in particular above 150 fs, in particular above 350 fs, in particular above 500 fs or above 1 ps and/or below 2 ps, and a comparatively high pulse energy (>>µJ). These may either have a fixed wavelength/frequency or be tunable for their part. In general, such sources are based on the principle of the chirped pulse amplification (CPA) technique or a similar principle. Preferably, the pump laser is selected from the group of lasers consisting of: Yb laser, Er laser, Nd laser, Tm laser.

The entire arrangement with pump laser also serves as a basis for extension into the UV range by means of wavelength multiplication or into the mid-/far-infrared (MIR/FIR or THz range) by difference frequency generation (DFG). In this case, the VIS/NIR wavelength range is intended to be covered gap-free and to cover a range of more than one octave.

These and other extensions are also encompassed by the subject matter of an arrangement and of a system as disclosed herein and also of a method as disclosed herein.

To put it briefly and by way of example, the invention relates to the subject matter for generating a wide visible to infrared, in any case near-infrared, spectrum of coherent ultra-short light pulses with an optical amplifier arrangement of optical parametric amplifiers, and to an optical amplifier arrangement of optical parametric amplifiers, and also to a laser amplifier system. Such subject matter in accordance with the insight of the invention encompasses a pre-OPA (OPA1) required for the industrially suitable implementation for an infrared, in any case near-infrared, spectrum of coherent ultra-short light pulses, and with an extended white light generation described above, which are designed for pump lasers having wavelengths above 950 nm, in particular near 1 µm (Nd/Yb lasers and related lasers), 1.5 µm (erbium lasers), 1850 nm, in particular around 2 µm (thulium, Cr:ZnS; Cr:ZnSe); such subject matter is preferably designed moreover for a pulse duration (pulse length) of above 100 fs, in particular above 150 fs, in particular above 350 fs, in particular above 500 fs or above 1 ps and/or below 2 ps.

In this case, the provision of the seed is beset by two basic problems, moreover, as is evident and recognized by the invention: besides (1) the necessary spectral power density in the wavelength range of interest (amplification range of the main-OPA), this is (2) providing a continuous spectrum of high temporal and spatial coherence without gaps.

In the case of an OPA there is firstly a degeneration point at a specific wavelength, i.e. this is the wavelength in an OPA at which signal and idler are of the same wavelength, i.e. for an SHG-pumped OPA as here the pump wavelength of the laser is the degeneration point.

What is characteristic of a white light spectrum from a white light generation is—as recognized by the invention—a certain temporally and/or spectrally unstable amplitude and phase modulation of the white light around the wavelengths of the generator. The concept of only one optical parametric amplifier seeded directly with a white light and pumped with in any case a second harmonic therefore leads to an unstable gap in the output spectrum; the usable output spectrum of the optical parametric amplifier thus has a tunability gap on account of said instabilities of the white light seed.

In specific detail the invention has recognized:
1. The degeneration point of an OPA is the point at that wavelength at which the wavelengths of the signal and of the idler correspond; i.e. at double the pump wavelength in the present case. In the case of the SHG-pumped OPA (here OPA2), the degeneration point is thus equal to the fundamental wavelength, i.e. the laser wavelength preferably of the pump laser.
2. The white light is always unstable (severe amplitude and phase modulations) in the region of the generating fundamental wavelength, preferably of the pump laser.
3. If white light is thus generated with the laser wavelength in the case of an SHG-pumped OPA, the OPA is unstable in the degeneration range on account of the unstable white light, i.e. is regularly not continuously tunable in the degeneration range of the second optical parametric amplifier (OPA2) at the fundamental, preferably of the pump laser.

For this reason, the OPA concept of the subject matter of the invention aims to provide such a gap-free seed. OPA1 serves for generating a pulse which is shifted toward longer wavelengths and which is in turn used to generate a seed having an even greater spectral bandwidth than would be possible merely by using the light from the pump laser. This has the advantage that the OPA2 is able to tune across its degeneration point, i.e. the second optical amplifier (OPA2) can be continuously tuned over its degeneration range at the fundamental, preferably of the pump laser, without the output spectrum having an unstable gap in the above sense.

Specifically, if the generating wavelength for the white light is shifted (away from the degeneration point)—in the present case in accordance with the concept of the invention by means of the first optical parametric amplifier OPA1—the white light (WLC2) is stable at the degeneration point of the second optical parametric amplifier OPA2 and thus so is OPA2. White light is indeed still unstable in the range around the generating wavelength; however, since the signal and the idler of the OPAL are different (not at the degeneration point), the wavelength can still be tuned differently. By way of example, this can be implemented by seeding the signal belonging to the corresponding idler wavelength, which may then be identical to the generating white light wavelength.

Moreover, the concept affords the following direct advantage of an implementation resulting in a benefit of the signal from the pre-OPA (OPA1) for WLC. THz-pumped OPAs or NOPAs could also be used, tuning via the degeneration point nevertheless being possible since less light is required for the pre-OPA (OPA1).

Further advantageous developments of the invention can be gathered from the dependent claims and specify in specific detail advantageous possibilities for realizing the concept explained above in the context of the stated object and also with regard to further advantages.

Preferably, the second white light generation is effected by means of the first signal light of the first optical parametric amplifier. With the higher-energy signal light, which moreover is not as far in the infrared as the idler light, a white light can be generated in the entire relevant range more simply and more intensively. Another implementation uses the idler from the pre-OPA for WLC—the main-OPA is passively CEP-stable as a result, i.e. the carrier envelope thereof is phase-stable with respect to the wavelength. Such an implementation is not of primary importance in the present case—an industrially suitable and stable system availability arises in the present case via the second white light generation by means of the first signal light.

It is evident in the context of one development that it is advantageous for preferably the first signal light of the first optical parametric amplifier, in particular the second white light generation, to be generated at wavelengths in a range which are at least up to 5% longer than the wavelength of the fundamental preferably of the pump laser. The development has recognized that this constitutes a particularly advantageous prerequisite for ensuring the spectral properties of the wide visible to infrared, in any case near-infrared, spectrum of coherent ultra-short light pulses if this is intended to be continuously tunable, in particular through a degeneration range of the second optical parametric amplifier (OPA2) at the fundamental, preferably of the pump laser.

Preferably, in the context of an application of the wide visible to infrared, in any case near-infrared, spectrum of coherent ultra-short light pulses, it is provided that
the optical parametric amplifiers and white light generations are configured, in particular the first white light generation and the first optical parametric amplifier and also a harmonic generation, in particular frequency doubling, are configured to be pumped by a laser which
supplies the fundamental in a wavelength range above 950 nm, in particular just above 1 μm, or just above 2 μm, and
with a pulse energy below 300 μJ, in particular below 100 μJ, and/or
with a repetition rate above 50 kHz, in particular above 100 kHz, and/or
with a pulse duration (pulse length) above 100 fs, in particular above 150 fs, in particular above 350 fs, in particular above 500 fs or above 1 ps and/or below 2 ps. The main range of the pulse lengths is preferably around 300-350 fs. A preferred range encompasses temporal pulse lengths of from 200 fs to 500 fs or wider from 200 fs to 2 ps. If appropriate, it is even possible to employ pulses having a pulse length of up to 5 ps or 10 ps; ultimately the present concept also allows longer pulse lengths even taking account of the fact that the efficiency of the nonlinear processes should decrease with longer pulse lengths.

Preferably, in the context of an application in the near-IR range of the wide visible to infrared, in any case near-infrared, spectrum of coherent ultra-short light pulses, it is provided that
the fundamental is generated by a pump laser which is selected from the group of lasers consisting of: Yb laser, Er laser, Nd, wherein
during operation the fundamental is in a wavelength range above 950 nm, in particular just above 1 μm, and
the second signal light and the second idler light of the second optical parametric amplifier together cover a tunability range of wavelengths between 500 nm and 5000 nm, wherein
between wavelengths in the tunability range throughout continuous tuning can be carried out, in particular continuous tuning can be carried out through a degeneration range of the fundamental, preferably of the pump laser.

Regarding Er, the generated pump wavelength is at 1550 nm; the 1 μm lasers are usually either Nd or Yb doped materials.

Preferably, in the context of an application in the far-IR range of the wide visible to infrared, in any case near-infrared, spectrum of coherent ultra-short light pulses, it is provided that the fundamental is generated by a pump laser which is selected from the group of lasers consisting of: Tm laser, wherein
during operation the fundamental is in a wavelength range around 2 μm, and
the second signal light and the second idler light of the second optical parametric amplifier together cover a tunability range of wavelengths between 900 nm and 2 μm, in particular up to 3 μm, if appropriate even up to 20 μm, wherein
between wavelengths in the tunability range throughout continuous tuning can be carried out, in particular continuous tuning can be carried out through a degeneration range of the OPA at the pump wavelength of the laser.

It is advantageously provided that, in the context of a preferred first variant regarding the phase matching geometry (oOPA)

the first optical parametric amplifier and/or the second optical parametric amplifier are/is operated in a collinear phase matching geometry (OOPA), and/or the first optical parametric amplifier and/or the second optical parametric amplifier comprise a nonlinear crystal of type I, type II or type 0 (periodically poled), in particular comprise a nonlinear crystal which is selected from the group of crystals consisting of crystals of the: BBO, LBO, KTP or LNBO3 family.

In particular, a first modified development has proved to be particularly preferred in which the first optical parametric amplifier is operated in a collinear phase matching geometry (oOPA) and the first optical parametric amplifier comprises a nonlinear crystal of type I or type II or type 0. In particular (preferably in combination with the first modified development) a second modified development has proved to be particularly preferred in which the second optical parametric amplifier (also) is operated in a collinear phase matching geometry (oOPA) and the second optical parametric amplifier comprises a nonlinear crystal of type II. The last-mentioned restriction of the second optical parametric amplifier to a nonlinear crystal of type II ensures a stable tunability through the degeneration point between signal wavelength and idler wavelength. Overall it is evident that in the context of these modified developments dispersion problems are reduced and the pulse stability and handleability of the system are better.

It is advantageously provided that, in the context of a different first variant regarding the phase matching geometry (oOPA)

the first optical parametric amplifier and/or the second optical parametric amplifier are/is operated in a non-collinear phase matching geometry (nOPA), and/or the first optical parametric amplifier and/or the second optical parametric amplifier comprise a nonlinear crystal of type I, type II or type 0 (periodically poled), in particular comprise a nonlinear crystal which is selected from the group of crystals consisting of crystals of the: BBO, LBO, KTP or LNBO3 family. It is evident that the achievable pulse lengths are shorter in the context of this development.

It is advantageously provided that, in the context of a preferred second variant regarding a pump geometry, during operation the first white light generation and the first optical parametric amplifier are pumped by a fundamental of a laser which is drawn in an optical set-up from the harmonic generation, in particular frequency doubling, in particular the fundamental of a laser is drawn in transmission downstream of the harmonic generation, in particular frequency doubling. This has the advantage that the available pump energy of the pump laser can be better utilized and becomes relevant in particular if less favorable conditions exist; an efficient utilization of the available pump energy is ensured in addition.

It is advantageously provided that, in the context of a different second variant regarding a pump geometry, during operation the first white light generation and the first optical parametric amplifier are pumped by a fundamental of the OPA at the pump wavelength of a laser which is drawn in an optical set-up directly from the laser, in particular the harmonic generation, in particular frequency doubling, is arranged in a side arm of the fundamental.

Embodiments of the invention will now be described below with reference to the drawing. The latter is intended to illustrate the embodiments not necessarily to scale; rather, the drawing, where useful for explanation purposes, has been created in a schematic and/or slightly distorted form. With regard to supplementations of the teachings directly discernible from the drawing, reference is made to the relevant prior art. It should be taken into account here that diverse modifications and amendments regarding the form and the detail of an embodiment can be made, without departing from the general concept of the invention. The features of the invention that are disclosed in the description, in the drawing and also in the claims may be essential to the development of the invention both individually and in any desired combination. Moreover, the scope of the invention encompasses all combinations of at least two of the features disclosed in the description, the drawing and/or the claims. The general concept of the invention is not restricted to the exact form or detail of the preferred embodiments shown and described below or restricted to subject matter that would be restricted in comparison with the subject matter claimed in the claims. In the case of dimensioning ranges indicated, values lying within the stated limits are intended also to be disclosed and arbitrarily usable and claimable as limit values. For the sake of simplicity, identical reference signs are used hereinafter for identical or similar parts or parts having an identical or similar function.

BRIEF DESCRIPTION OF THE DRAWINGS

Further advantages, features and details of the invention are evident from the following description of the preferred embodiments and with reference to the drawing, in which:

FIGS. 1A and 1B show a schematic overview of an optical amplifier arrangement of optical parametric amplifiers and white light generations and also a harmonic generation, namely here a frequency doubling, for generating a wide visible to infrared, in any case near-infrared, spectrum of coherent ultra-short light pulses, in the present case as a laser amplifier system comprising a pump laser—view (A) shows an embodiment in accordance with the abovementioned preferred second variant regarding a pump geometry, in which the fundamental of the pump laser is drawn in transmission downstream of the harmonic generation, namely here a frequency doubling, and view (B) shows an embodiment in accordance with the abovementioned different second variant regarding a pump geometry, in which the fundamental of the laser is used directly from the laser, that is to say from a side arm of the harmonic generation, for pumping the white light generation or the OPA;

DETAILED DESCRIPTION

Figure 1A:
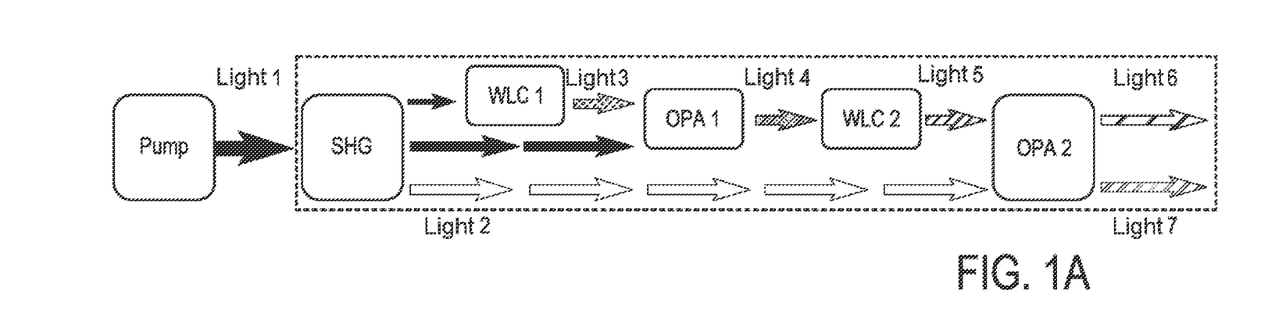
Figure 1B:
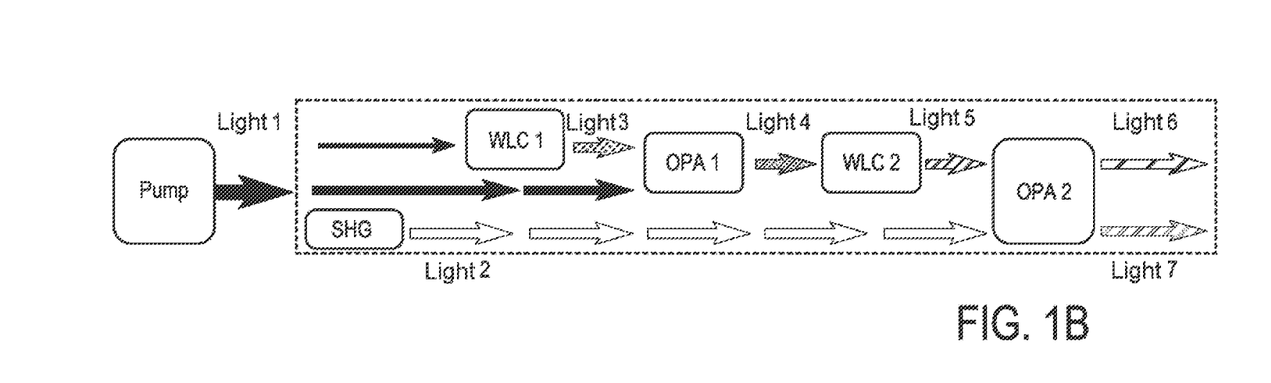
Figure 2:
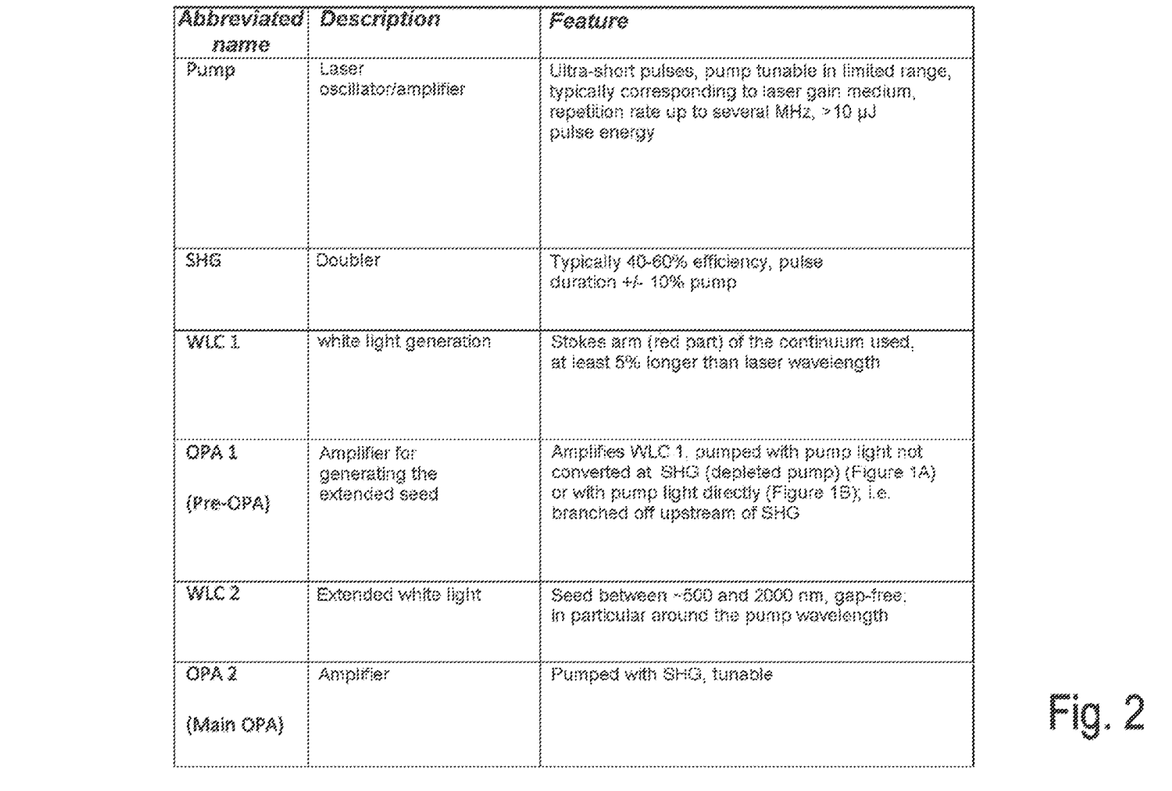
FIG. 2 shows a tabular overview of the optical generators associated with the abbreviations, and their preferred properties.

In the present case the individual radiation generators are described referring in particular to FIG. 1A, FIG. 1B and FIG. 2.

Pump Laser

For pumping the OPA, preferably but not necessarily a laser system with "chirped pulse amplification" (CPA) technology is used with which wavelength of approximately 1000 nm (typically between 1020 and 1064 nm) are generated, either on the basis of fiber lasers, free space systems or on the basis of a combination of both possibilities. The envisaged class of devices is flexible in the choice of repetition rate (single shot—a few MHz) and pulse energy (1 µJ or more, in particular 10 µJ-10 mJ). Since the compression of the laser pulses cannot take place within a fiber owing to the high peak power, all possible laser systems (including fiber lasers) of this type have a free space output. A pulse duration as short as possible is advantageous for the operation of the OPA on account of the underlying nonlinear processes. However, the present concept also proves to be successful in the case of somewhat "longer" ultra-short pulses having a pulse duration (pulse length) of above 100 fs, in particular above 150 fs, in particular above 350 fs, in particular above 500 fs or above 1 ps, and/or below 2 ps, in order to ensure the seed generation method described further below (light_1). With the use of longer pulses, the spectral widening does not take place, or does not take place efficiently enough, rather there is damage to the nonlinear material in WLC 1.

Harmonic Generation, in Particular Frequency Doubling—SHG

The OPA as first crucial element has an efficient doubling—possibly even tripling or quadrupling or other harmonics—of the pump radiation coupled in (conversion of light_1 into light_2). Pulse duration and beam quality remain largely identical here (see the table). In a nonlinear crystal, the doubling takes place with maintenance of the phase matching (either noncritical phase matching or quasi phase matching). In order to achieve noncritical PM, the crystal has to be heated and, for this purpose, it is accommodated in a furnace or else a fan structure (FAN-out structure) known per se with different polarities is used.

WLC 1

In order to make available seed radiation (light_3) for the pre-OPA (OPA1), part (~1 µJ) of the pump light (light_1) is focused into a solid. This is generally a typical laser material such as YAG, but may also be e.g. YVO4, GdVO4, GGG, sapphire or one of the many other materials, preferably undoped crystals, which are not destroyed at these powers. As already described further above, a pulse duration of above 100 fs is possible, but a pulse duration of less than ~2 ps is expedient in order to obtain the required spectral widening. The important points alongside the high destruction threshold include the generation of the widest possible supercontinuum ("supercontinuum generation", also: "white-light generation") with high efficiency (spectral power density) and temporal and also spatial coherence. A certain intensity threshold of light_1 must be achieved here. Said intensity threshold is dependent on wavelength, pulse duration, beam quality and focus parameters of light_1 and also on the material used in WLC 1.

The method for generating seed light in this way has proved to be important technology in the construction of tunable OPAs. Differentiations in the method are normally merely restricted to the choice of material—in the first publications sapphire, nowadays normally YAG—or to the choice of beam parameters—focusing, beam sizes. What is important is the presence of sufficient spectral power density (W/nm) in the necessary wavelength range—as an example in the case of WLC1: between 1600 and 2000 nm.

In principle, this part in any case need not be generated by the pump laser itself, but rather may also be implemented by an external source (laser diode, solid-state laser) at a wavelength in this range; however, such an OPA is then no longer wavelength-tunable.

OPA1

In a further nonlinear crystal, the seed light (light_3, e.g. 1600-2000 nm) is combined with the pump (light_1, here: 1030 nm) and amplified. This crystal is the OPA1 (in our notation: "pre-OPA"), which serves to amplify the seed from WLC1. It is a nonlinear crystal that is operated by the unconverted pump (e.g. pump (1030 nm) ☐☐ signal (1600 nm)+idler (2900 nm)). A high destruction threshold of the material must be ensured alongside the phase matching. The efficiency of this process must be chosen to be high enough to enable the second process of seed generation (light_5 is generated from light_4) in the later beam path. In a manner similar to that in WLC1, a certain intensity threshold, which is dependent precisely on wavelength, pulse duration and beam quality of light_4, has to be achieved since otherwise spectral widening does not take place. It is necessary once again to generate a bandwidth which makes it possible to generate a femtosecond pulse, although this is ensured automatically with the use of an fs pulse in light_1.

WLC 2

Here the extended seed for the downstream OPA stage (OPA2, main-OPA) is generated by spectral widening by filamentation. Light_4, which was generated in the OPA1, is used. When an intensity threshold is exceeded, which is dependent on the material parameters (keywords: critical power), analogously to WLC 1, the generation of a supercontinuum (light_5) takes place—a process which is based principally on the principle of self phase modulation (SPM). Exactly as in WLC 1, this light is of high temporal and spectral coherence and of very high beam quality (focusability). The lower threshold for achieving the high spectral widening is approximately four times the critical power, which is a material property. This lower threshold can easily be influenced by the choice of focusing (numerical aperture, NA) of the incident laser beam, and by the beam quality thereof (M2—value of the beam, focusability). The magnitude of the upper threshold is once again dependent on the respective material; in general, however, it is approximately 2-4× higher than the corresponding lower threshold.

In this case, the light_4 (e.g. 1600 nm) used for spectral widening has a longer wavelength than light_1 (e.g. 1030 nm), which is used in the traditional approach of seed generation (in commercial OPAs). Light_5 extends gap-free in the wavelength range between the wavelength of light_4 and the lower limit of the OPA gain bandwidth (this wide spectrum is designated as light_6 in FIG. 1 and FIG. 3) for example of approximately 620 nm in the case of approximately 515 nm as wavelength of light_2.

With the use of the pre-OPA idler as light_4, the seed light (light_5) has the property that carrier frequency and envelope of the pulse have a constant phase relationship with respect to one another (CEP stability).

OPA2

This OPA is pumped by the second harmonic of the pump laser (here: 515 nm, light_2) and substantially consists of one or more BBO crystals. Other nonlinear crystals are also conceivable, in particular a nonlinear crystal selected from the group of crystals consisting of crystals of the: BBO, LBO, KTP or LNBO3 family. Owing to the large available bandwidth of the seed, this OPA is tunable gap-free in the range between the lower limit of the crystal gain bandwidth (here for BBO: ~620 nm) and the wavelength of light_4

(here approximately 1600 to 2500 nm). The corresponding idler makes it possible to cover the wavelength range from the transmission limit of the amplifier crystal (here for BBO, ~2600 nm) up to the complementary idler wavelength that arises upon amplification of light_4 (here approximately 760 nm). Both outputs of the OPA (light_6 and light_7) thus overlap in principle in their tuning range (but not necessarily simultaneously). In this regard, it is possible to achieve a gap-free tunability of between 550 nm and 3 μm. With the use of a different crystal—in particular a nonlinear crystal selected from the group of crystals consisting of crystals of the: BBO, LBO, KTP or LNBO3 family—in principle it is even possible to achieve a gap-free tunability of between 500 nm and 5 μm. Light_6 and light_7 are separated either by a polarization-sensitive element or by a dichroic mirror.

The abovementioned optical generators can be optically coupled in the context of an optical set-up in such a way that during operation the first optical parametric amplifier is seeded by the first white light generation and the second optical parametric amplifier is seeded by the second white light generation, and wherein during operation the first white light generation and the first optical parametric amplifier and the harmonic generation, in particular frequency doubling, are pumped by a fundamental of a laser; i.e. in other words wherein a seed of the first optical parametric amplifier is effected by means of the first white light generation, and the second white light generation is effected by means of the first optical parametric amplifier and the second optical parametric amplifier is pumped by a second or higher harmonic of the fundamental of the pump laser, wherein a seed of the second optical parametric amplifier is effected by means of the second white light generation.

Figure 3A:
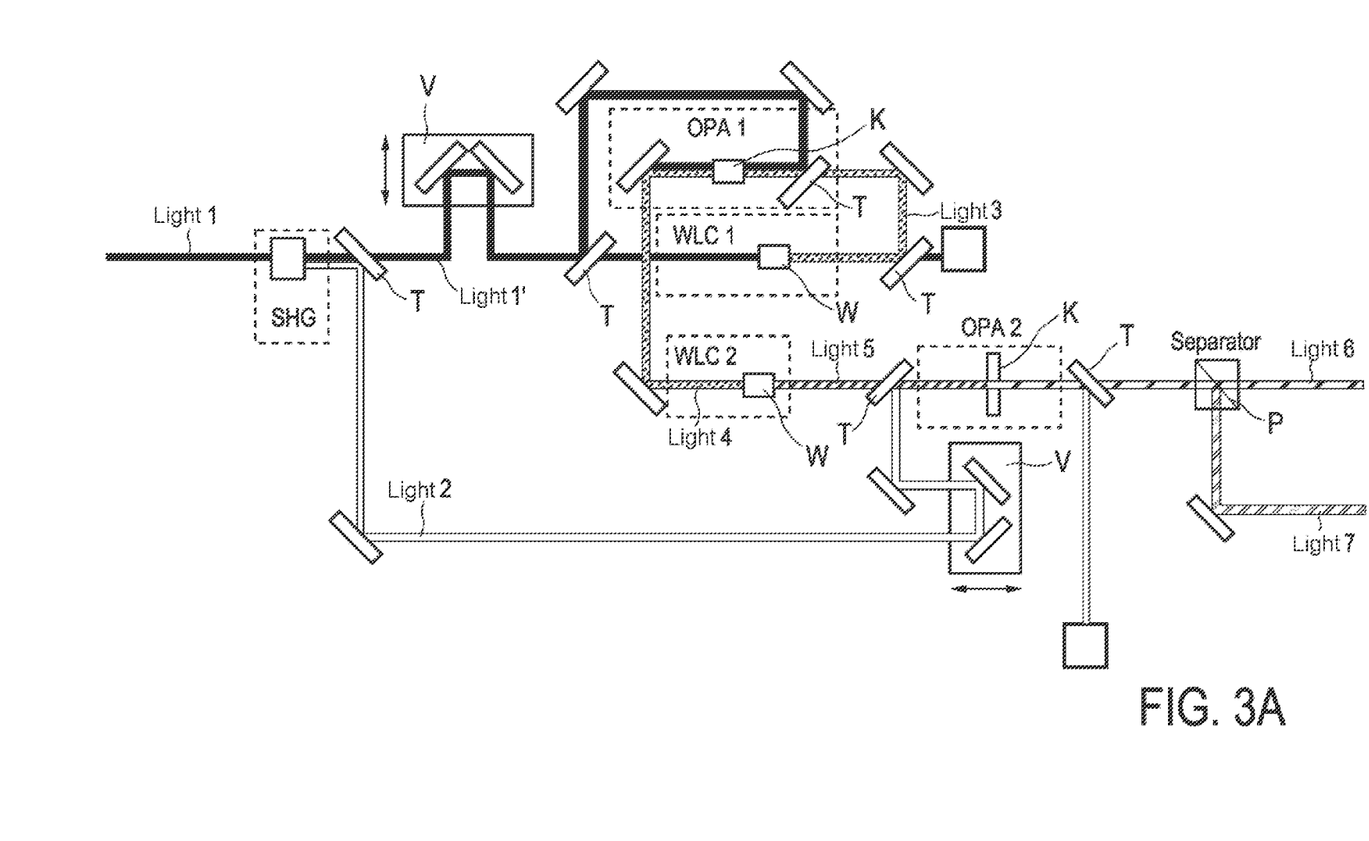
FIGS. 3A and 3B show a schematic overview of a concrete optical set-up of the optical amplifier arrangement shown in FIG. 1A.
Figure 3B:
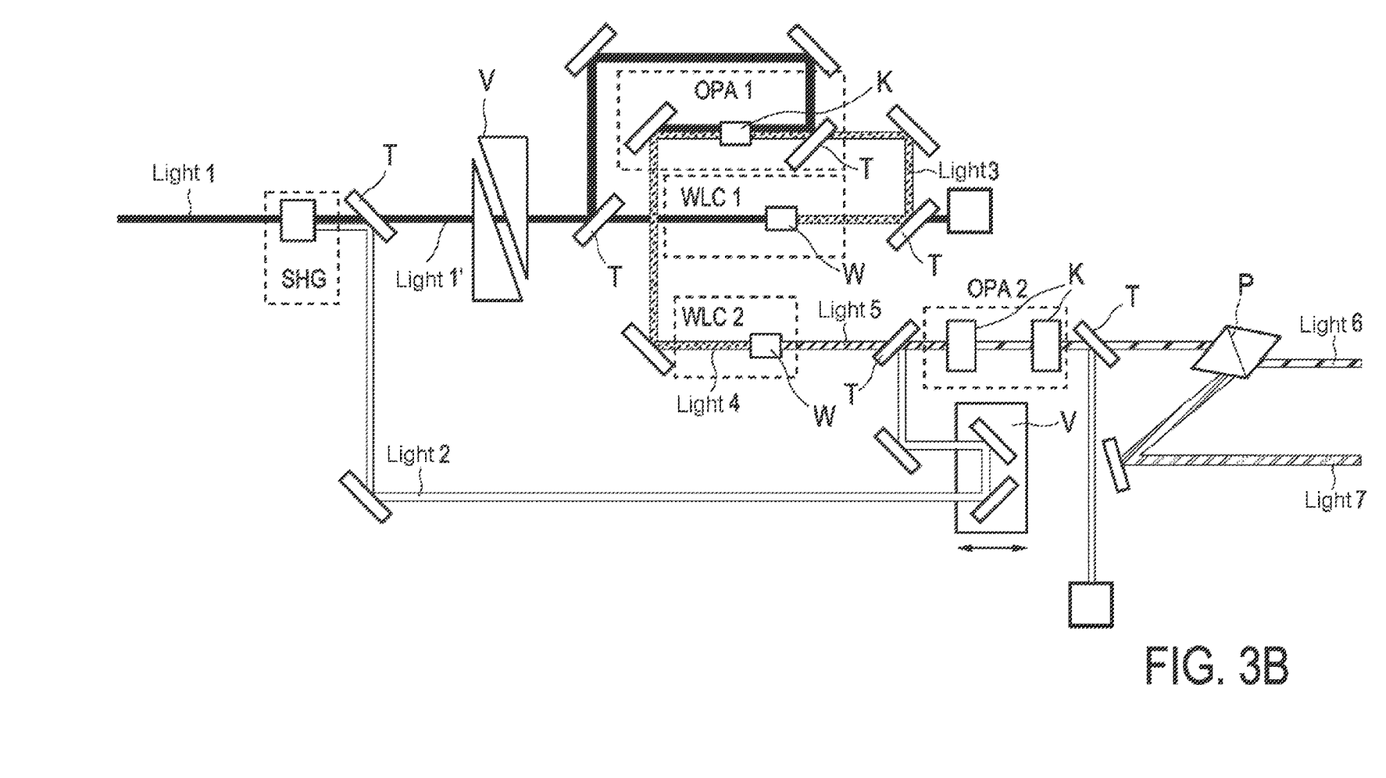

Referring to FIG. 3A, FIG. 3B, in the present case the individual radiation generators are described in terms of the optical set-up, i.e. in terms of their optical coupling. The pump laser light, designated therein as light_1, originates from the pump laser, which is shown in FIG. 1A—in the optical set-up, two delay paths V for a pump light (light_1 and light_2) are realized in order to be able to compensate for temporal delays of the pulses in the paths of the radiation guidance. In the embodiment in FIG. 3A, both delay paths are realized with a retroreflector and, in the embodiment in FIG. 3B, one of the two delay paths is realized with a dispersive element—here two transparent wedges upstream of the OPA1 and WLC1—and the other of the two delay paths is realized with a retroreflector—here a movable slide with two mirrors upstream of the OPA2.

An optical coupling of the individual optical units, in particular radiation generators, can be realized in the context of the above-described optical set-ups shown in detail in FIG. 3A and FIG. 3B. In the present case, the second optical amplifier OPA2 is embodied as a two-stage OPA, that is to say with a first and a second nonlinear crystal K, both of which are shown. The optical set-ups comprise a beam guidance with a suitable number of mirrors S, beam splitters T—the latter beam splitters T also as polarization-sensitive elements P and/or wavelength-sensitive elements (evident from the figure) or the like. In the radiation generators, the light is correspondingly focused into a nonlinear crystal K or white light crystal W of the type described above; this is done by means of a suitable focusing optical unit, which is not specifically shown.

The radiation guidance also includes the delay paths V shown in FIG. 3A and FIG. 3B. In both cases, this is upstream of the OPA2 a slide or other moving element with a retroreflector that is able to temporally delay the higher-harmonic light (light_2) drawn from the SHG, that is to say the associated pulses of the SHG, such that they temporally overlap a seed pulse from WLC2 in the OPA2 and thus establish the nonlinear conversion process for generating the idler (light_6) and signal (light_7) from OPA2.

In the case of FIG. 3A this is upstream of the OPA1 and WLC1 likewise a slide or other moving element with a retroreflector that is able to temporally delay the light (light_1) drawn from the pump laser, that is to say the associated pulses of the fundamental. In the case of FIG. 3B, this is upstream of the OPA1 and WLC1 a dispersive wedge element or other delaying optically transparent element that is able to temporally delay the light (light_1) drawn from the pump laser—that is to say the associated pulses of the fundamental—and to compensate again for dispersion or spectral spatial widening. This may for example be the wedges shown that are placed in relation to one another.

Figure 4A:
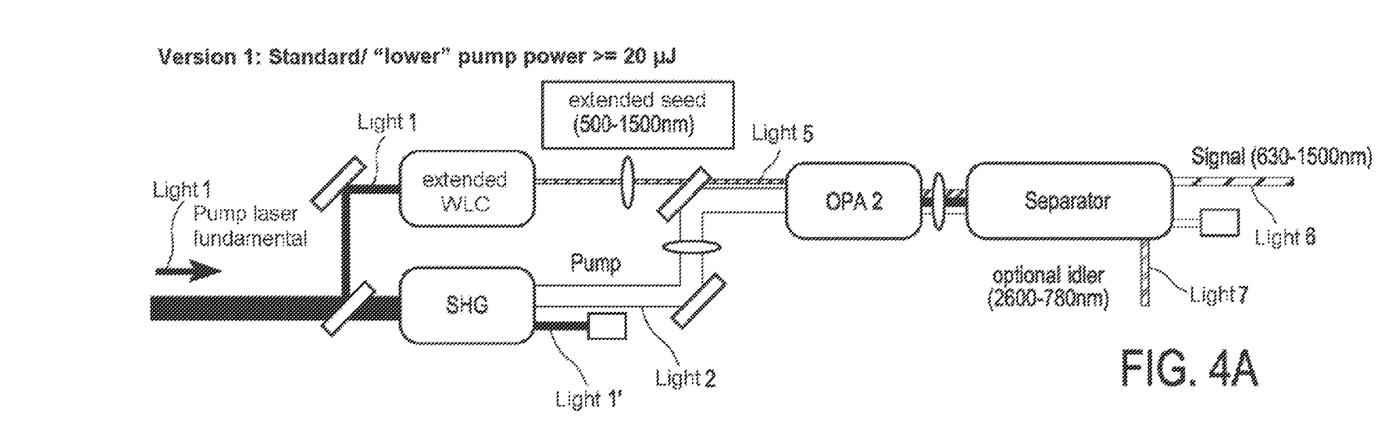
FIGS. 4A and 4B show a schematic illustration of an optical amplifier arrangement in accordance with the abovementioned different second variant regarding a pump geometry, in which the harmonic generation (SHG) is arranged in a side arm of the fundamental of the OPA at the pump wavelength.
Figure 4B:
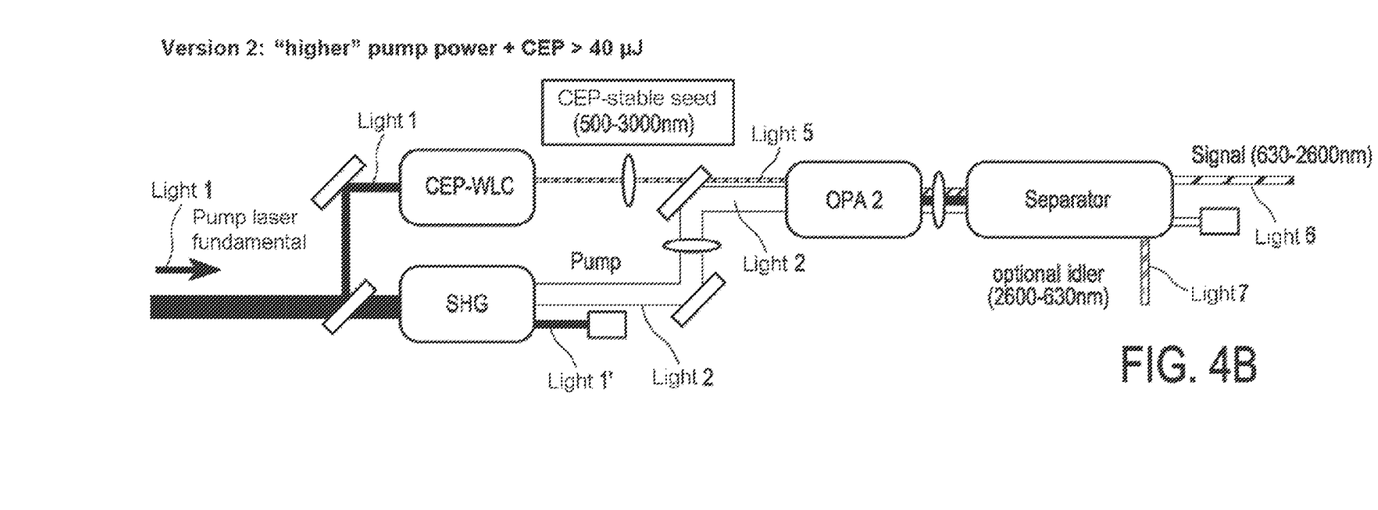

FIG. 4 shows a variant that is modified in principle in terms of set-up—in accordance with the second variant mentioned above—in which the harmonic generation, namely here the frequency doubling, SHG and the white light generation are separated in different side arms, that is to say in principle in accordance with the scheme of the embodiment in FIG. 1B. Referring to FIG. 4A and FIG. 4B, the pump laser light is used to generate a so-called extended white light, namely as is shown in FIG. 1B, by means of WLC1 and OPA1 (designated here as "extended WLC", or CEP-stable WLC). In this respect, FIG. 4A shows the use of the signal output of OPA1 for generating white light in WLC2 as hence stabler embodiment thus preferring lower pump power, preferably above 20 μJ. In this respect, FIG. 4B shows the use of the idler output of OPA1 for generating white light in WLC2, in order to achieve a carrier-envelope-phase-stable white light generation (CEP) there, as somewhat more unstable embodiment thus preferring more pump power, preferably above 40 μJ, in particular above 100 μJ.

It is evident that, in accordance with the embodiment in FIG. 4A, the use of the signal light from OPA1 leads to a particularly preferred seed light of between 500 and 1500 nm at pump powers in the range of 20 μJ or somewhat more.

FIG. 4B shows a modified embodiment by means of the carrier-envelope-phase-stable pulses (CEP pulses) with significantly higher requirements made of the pump energies, preferably above 40 μJ;—this presupposes the use of an idler light from OPA1 for generating WLC2.

The advantages of the embodiments mentioned in FIG. 4A reside primarily in the tunability through the degeneration point and a possible individual output port for a signal from OPA2 with light_6 in the wavelength range of 630 nm to 1500 nm. Optionally, it is possible to use the idler output of light_7 from OPA2 with a wavelength range of 780 to 2600 nm. The advantage also resides in being able to arrange a separate harmonic generation, namely here the frequency doubling, that is to say here by means of a second harmonic generation (SHG) in a side arm. With the use of a quadruple harmonic (FHG), it is possible to achieve a degeneration point of free tunability down to 210 nm.

The advantage of an embodiment shown in FIG. 4B resides in the fact that a tunability via the degeneration point is likewise achievable, wherein the signal wavelengths from OPA2 (light_6) are in the range of between 630 and 2600 nm, or correspondingly with the use of the idler output—all pulses generated there are carrier-envelope-phase-stable, which results on account of the intrinsic CEP-stable signal pulses (as explained above). Here, too, there is a possibility of coupling out the generated light from OPA2 via a single output. Both in the embodiment in FIG. 4A and in the embodiment in FIG. 4B this can be achieved primarily by means of a collinear embodiment of the OPA2 (oOPA) in contrast to a non-collinear arrangement (nOPA). Here, too, with a single frequency doubling (SHG) replaced by a quadruple harmonic (FHG), it is possible to achieve a degeneration-point-free tunability down to 210 nm.

The invention claimed is:

1. An optical amplifier arrangement of optical parametric amplifiers and white light generations and a harmonic generation, for generating a wide visible to infrared spectrum of coherent ultra-short light pulses with a pump laser, comprising:
a first white light generation and a first optical parametric amplifier for generating a first signal light and a first idler light and also a second white light generation and a second optical parametric amplifier for generating a second signal light and a second idler light and the harmonic generation, which are optically coupled in such a way that
during operation the first optical parametric amplifier is pumped by the first white light generation and the second optical parametric amplifier is pumped by the second white light generation, and wherein during operation
the first white light generation and the first optical parametric amplifier and the harmonic generation are pumped by a fundamental of a laser, wherein a seed of the first optical parametric amplifier is effected by means of the first white light generation, and
the second white light generation is effected by means of the first optical parametric amplifier and the second optical parametric amplifier is pumped by a second or higher harmonic of the fundamental of the pump laser, wherein a seed of the second optical parametric amplifier is effected by means of the second white light generation, wherein
during operation the fundamental is in a wavelength range above 950 nm, and
the second signal light and the second idler light of the second optical parametric amplifier together cover a tunability range of wavelengths between 500 nm and 5 μm, wherein
between wavelengths in the tunability range throughout continuous tuning can be carried out through a degeneration range of the second optical parametric amplifier at the fundamental of the pump laser.

2. The amplifier arrangement according to claim 1, wherein the second signal light and the second idler light of the second optical parametric amplifier together cover a tunability range of wavelengths between 550 nm and 3 μm.

3. The amplifier arrangement according to claim 1, wherein
the second white light generation is effected by means of the first signal light of the first optical parametric amplifier.

4. The amplifier arrangement according to claim 1, wherein
at least the first white light generation and the first optical parametric amplifier and also the harmonic generation, are configured to be pumped by a laser which supplies the fundamental in a wavelength range above 950 nm or above 1850 nm, and
with a pulse energy below 300 μJ, and/or
with a repetition rate above 50 kHz, and/or
with a pulse duration above 100 fs or above 1 ps and/or below 2 ps.

5. The amplifier arrangement according to claim 4, wherein the laser supplies the fundamental in a wavelength range above 1 μm or 2 μm, with a pulse energy below 100 μJ, and/or with a repetition rate above 100 kHz and/or a pulse duration above 150 fs.

6. The amplifier arrangement according to claim 1, wherein
the fundamental is generated by a pump laser which is selected from the group of lasers consisting of: Yb lasers, Er lasers and Nd lasers, wherein
during operation the fundamental is in a wavelength range above 950 nm, and
the second signal light and the second idler light of the second optical parametric amplifier together cover a tunability range of wavelengths between 500 nm and 5 μm, wherein
between wavelengths in the tunability range throughout continuous tuning can be carried out through the degeneration range of the second optical parametric amplifier at the laser wavelength.

7. The amplifier arrangement according to claim 6, wherein, during operation, the fundamental is in a wavelength range of above one μm, and wherein the second signal light and the second idler light of the second optical parametric amplifier together cover a tunability range of wavelengths between 550 nm and 3 μm.

8. The amplifier arrangement according to claim 1, wherein the fundamental is generated by a pump laser which is selected from the group of lasers consisting of Tm lasers, wherein
during operation the fundamental is in a wavelength range of 2 μm, and
the second signal light and the second idler light of the second optical parametric amplifier together cover a tunability range of wavelengths between 900 nm and 20 μm, wherein
between wavelengths in the tunability range throughout continuous tuning can be carried out through the degeneration range of the second optical parametric amplifier at the laser wavelength.

9. The amplifier arrangement according to claim 1, wherein the second white light generation is generated at wavelengths in a range which are at least up to 5% longer than the fundamental of the pump laser.

10. The amplifier arrangement according to claim 1, wherein
the first optical parametric amplifier and/or the second optical parametric amplifier are/is operated in a collinear phase matching geometry, and/or
the first optical parametric amplifier and/or the second optical parametric amplifier comprise a nonlinear crystal of type I, type II or type 0, which is selected from the group of crystals consisting of crystals of the: BBO, LBO, KTP and LNBO3 family.

11. The amplifier arrangement according to claim 1, wherein
the first optical parametric amplifier and/or the second optical parametric amplifier are/is operated in a non-collinear phase matching geometry, and/or
the first optical parametric amplifier and/or the second optical parametric amplifier comprise a nonlinear crystal of type I, type II or type 0 which is selected from the group of crystals consisting of crystals of the: BBO, LBO, KTP and LNBO3 family.

12. The amplifier arrangement according to claim 1, wherein during operation the first white light generation and the first optical parametric amplifier are pumped by a fundamental of a laser which is drawn in an optical set-up from the harmonic generation.

13. The amplifier arrangement according to claim 1, wherein, during operation, the first white light generation and the first optical parametric amplifier are pumped by a fundamental of a laser which is drawn in an optical set-up directly from the laser.

14. A laser amplifier system comprising an optical amplifier arrangement according to claim 1 and a pump laser.

15. The laser amplifier system according to claim 14, wherein the pump laser is selected from the group of lasers consisting of: Yb lasers, Er lasers, Nd lasers and Tm lasers.

16. A method for generating a wide visible to infrared spectrum of coherent ultra-short light pulses with an optical amplifier arrangement of optical parametric amplifiers and white light generations and a harmonic generation for generating a wide visible to infrared spectrum of coherent light with an optical amplifier arrangement according to claim 1, comprising:
- a first white light generation and a first optical parametric amplifier for generating a first signal light and a first idler light and also a second white light generation and a second optical parametric amplifier for generating a second signal light and a second idler light and the harmonic generation, which are optically coupled in such a way that
  - during operation the first optical parametric amplifier is pumped by the first white light generation and the second optical parametric amplifier is pumped by the second white light generation, and wherein during operation the first white light generation and the first optical parametric amplifier and the harmonic generation are pumped by a fundamental of a laser, wherein a seed of the first optical parametric amplifier is effected by means of the first white light generation, and the second white light generation is effected by means of the first optical parametric amplifier and the second optical parametric amplifier is pumped by a second or higher harmonic of the fundamental of the pump laser, wherein a seed of the second optical parametric amplifier is effected by means of the second white light generation, wherein during operation the fundamental is in a wavelength range above 950 nm, and the second signal light and the second idler light of the second optical parametric amplifier together cover a tunability range of wavelengths between 500 nm and 5 µm, wherein between wavelengths in the tunability range throughout continuous tuning can be carried out through the degeneration range of the second optical parametric amplifier at the fundamental of the pump laser.

* * * * *